US012776877B2

(12) United States Patent
Wang et al.

(10) Patent No.: US 12,776,877 B2
(45) Date of Patent: Oct. 27, 2026

(54) METHOD, DEVICE AND COMPUTER READABLE STORAGE MEDIUM OF COMMUNICATION

(71) Applicant: NEC CORPORATION, Tokyo (JP)

(72) Inventors: Gang Wang, Beijing (CN); Yukai Gao, Beijing (CN)

(73) Assignee: NEC CORPORATION, Tokyo (JP)

( * ) Notice: Subject to any disclaimer, the term of this patent is extended or adjusted under 35 U.S.C. 154(b) by 346 days.

(21) Appl. No.: 18/570,679

(22) PCT Filed: Jun. 17, 2021

(86) PCT No.: PCT/CN2021/100717
§ 371 (c)(1),
(2) Date: Dec. 15, 2023

(87) PCT Pub. No.: WO2022/261909
PCT Pub. Date: Dec. 22, 2022

(65) Prior Publication Data

US 2024/0283606 A1 Aug. 22, 2024

(51) Int. Cl.
*H04L 5/00* (2006.01)

(52) U.S. Cl.
CPC .................................. *H04L 5/0051* (2013.01)

(58) Field of Classification Search
CPC ..................................................... H04L 5/0051
USPC .......................................................... 370/329
See application file for complete search history.

(56) References Cited

U.S. PATENT DOCUMENTS 11,632,751 B2 * 4/2023 Sengupta .............. H04L 5/0064 370/329
2015/0282158 A1 10/2015 Chen et al.
2016/0057753 A1 2/2016 Yang et al.
2017/0273026 A1 * 9/2017 Fakoorian ........... H04L 27/2649
2019/0268934 A1 8/2019 Korhonen et al.
2020/0053703 A1 * 2/2020 Akkarakaran ............ G01S 1/20
2020/0119880 A1 4/2020 Liu et al.
2022/0322332 A1 * 10/2022 Taherzadeh Boroujeni ................ H04L 5/0051
2022/0330233 A1 * 10/2022 Park ...................... H04W 72/56
2022/0400465 A1 * 12/2022 Opshaug ................. H04L 5/026
2023/0006776 A1 * 1/2023 Yang ......................... H04L 1/00
(Continued)

FOREIGN PATENT DOCUMENTS

WO WO-2022115884 A2 * 6/2022 ........... H04L 5/0094

OTHER PUBLICATIONS

ZTE, "Considerations for LTE Downlink DMRS Overhead Reduction", 3GPP TSG RAN WG1 #89, May 15-19, 2017, pp. 1-5, R1-1707187.

(Continued)

*Primary Examiner* — Peter G Solinsky
(74) *Attorney, Agent, or Firm* — Sughrue Mion, PLLC

(57) ABSTRACT

Embodiments of the present disclosure relate to methods, devices and computer readable media of communication. A transmitting device determines whether no DM-RS is to be transmitted on a first symbol configured for DM-RS transmission and if no DM-RS is to be transmitted on the first symbol, transmits a signal to a receiving device in at least part of REs on the first symbol, the signal comprising at least one of data or a PT-RS. The receiving device demodulates the signal from the at least part of REs on the first symbol. In this way, DM-RS overhead may be reduced and the interference to co-scheduled UE may be avoided.

20 Claims, 10 Drawing Sheets

(56) References Cited

U.S. PATENT DOCUMENTS

| | | | | |
|---|---|---|---|---|
| 2023/0051047 | A1* | 2/2023 | Xu | H04B 7/0695 |
| 2024/0155595 | A1* | 5/2024 | Cirik | H04L 5/0023 |

OTHER PUBLICATIONS

Intel Corporation, "Overhead reduction for DM-RS", 3GPP TSG RAN WG1 Meeting #89, May 15-19, 2017, pp. 1-2, R1-1707314.
Intel Corporation, "Overhead reduction for DM-RS", 3GPP TSG RAN WG1 Meeting #90, Aug. 21-25, 2017, pp. 1-2, R1-1712496.
International Search Report for PCT/CN2021/100717 dated Mar. 23, 2022.
Written Opinion for PCT/CN2021/100717 dated Mar. 23, 2022.

* cited by examiner

METHOD, DEVICE AND COMPUTER READABLE STORAGE MEDIUM OF COMMUNICATION

CROSS REFERENCE TO RELATED APPLICATIONS

This application is a National Stage of International Application No. PCT/CN2021/100717 filed Jun. 17, 2021.

TECHNICAL FIELD

Embodiments of the present disclosure generally relate to the field of telecommunication, and in particular, to methods, devices and computer readable storage media for data transmission with no or less demodulation reference signal (DM-RS) transmission.

BACKGROUND

With development of communication technology; artificial intelligence (AI)/machine learning (ML) may be introduced in a communication network for channel state information (CSI) inference. In other application scenarios, e.g. fixed wireless access (FWA) or other low mobility scenarios, the CSI is stable or doesn't change frequently over a time duration. The CSI includes at least DM-RS and/or phase tracking reference signal (PT-RS). An uplink or downlink data transmission may be performed with no or less DM-RS transmission so as to reduce DM-RS overhead. Less DM-RS transmission means lower density DM-RS in time or frequency domain than current new radio (NR) DM-RS configuration in 3GPP TS 38.211 v16.5.0. In this case, data mapping for no or less DM-RS transmission needs to be further studied.

SUMMARY

In general, example embodiments of the present disclosure provide method, device and computer readable storage medium of communication for data transmission with no or less DM-RS transmission.

In a first aspect, there is provided a method of communication. The method comprises: determining, at a first device, whether no DM-RS is to be transmitted on a first symbol configured for DM-RS transmission; and in accordance with a determination that no DM-RS is to be transmitted on the first symbol, transmitting a signal to a second device in at least part of resource elements (REs) on the first symbol, the signal comprising at least one of data or a PT-RS.

In a second aspect, there is provided a method of communication. The method comprises: receiving, at a second device, a signal from a first device, the signal comprising at least one of data or a PT-RS; and demodulating the signal from a first symbol configured for DM-RS transmission, no DM-RS being transmitted on the first symbol.

In a third aspect, there is provided a method of communication. The method comprises: receiving, at a terminal device and from a network device, downlink control information (DCI) scheduling transmission of downlink data, the DCI comprising a first indication that the downlink data is transmitted with no DM-RS or less DM-RS transmission. The terminal can demodulate the downlink data based on a trained CSI.

In a fourth aspect, there is provided a method of communication. The method comprises: generating, at a network device, DCI scheduling transmission of downlink data, the DCI comprising a first indication that the downlink data is transmitted with no DM-RS or less DM-RS transmission; and transmitting the DCI to a terminal device. The DCI can be used for the terminal device to understand that the demodulation of the downlink data will be based on a trained CSI.

In a fifth aspect, there is provided a method of communication. The method comprises: receiving, at a terminal device and from a network device, DCI scheduling transmission of uplink data; and in accordance with a determination that the DCI comprises a third indication that the uplink data is to be transmitted with no DM-RS or less DM-RS transmission, transmitting the uplink data together with no DM-RS or less DM-RS to the network device. The network device can demodulate the uplink data based on a trained CSI.

In a sixth aspect, there is provided a method of communication. The method comprises: generating, at a network device, DCI scheduling transmission of uplink data, the DCI comprising a third indication that the uplink data is to be transmitted with no DM-RS or less DM-RS transmission; and transmitting the DCI to a terminal device for transmission of the uplink data with no DM-RS or less DM-RS transmission.

In a seventh aspect, there is provided a first device. The first device comprises a processor configured to perform the method according to the first aspect of the present disclosure.

In an eighth aspect, there is provided a second device. The second device comprises a processor configured to perform the method according to the second aspect of the present disclosure.

In an ninth aspect, there is provided a terminal device. The terminal device comprises a processor configured to perform the method according to the third or fifth aspect of the present disclosure.

In a tenth aspect, there is provided a network device. The network device comprises a processor configured to perform the method according to the fourth or sixth aspect of the present disclosure.

In an eleventh aspect, there is provided a computer readable storage medium having instructions stored thereon. The instructions, when executed on at least one processor, cause the at least one processor to perform the method according to the first aspect of the present disclosure.

In a twelfth aspect, there is provided a computer readable storage medium having instructions stored thereon. The instructions, when executed on at least one processor, cause the at least one processor to perform the method according to the second aspect of the present disclosure.

In a thirteenth aspect, there is provided a computer readable storage medium having instructions stored thereon. The instructions, when executed on at least one processor, cause the at least one processor to perform the method according to the third or fifth aspect of the present disclosure.

In a fourteenth aspect, there is provided a computer readable storage medium having instructions stored thereon. The instructions, when executed on at least one processor, cause the at least one processor to perform the method according to the fourth or sixth aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
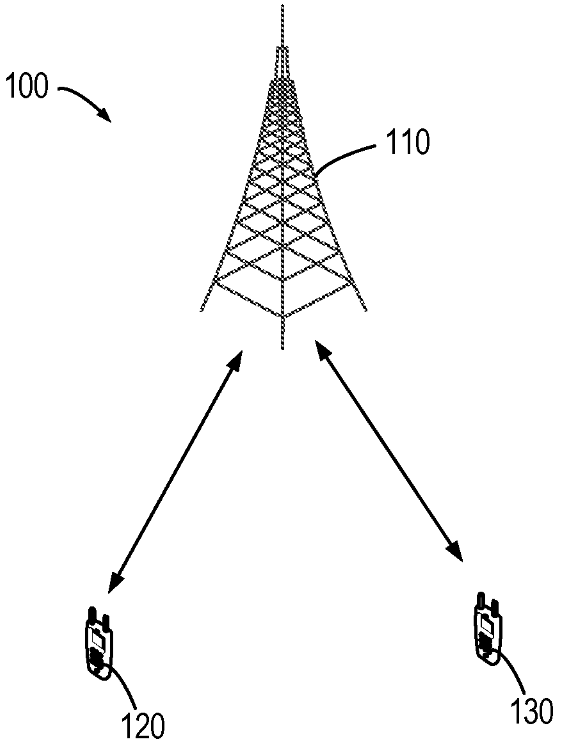
FIG. 1 illustrates an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below:

In the following description and claims, unless defined otherwise, all technical and scientific terms used herein have the same meaning as commonly understood by one of ordinary skills in the art to which this disclosure belongs.

As used herein, the term 'terminal device' refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, devices for Integrated Access and Backhaul (IAB), or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), an IAB node, a low power node such as a femto node, a pico node, and the like.

As used herein, the term 'network device' or 'base station (BS)' refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Remote Radio Unit (RRU), a radio head (RH), a remote radio head (RRH), an IAB node, a low power node such as a femto node, a pico node, and the like.

In one embodiment, the terminal device may be connected with a first network device and a second network device. One of the first network device and the second network device may be a master node and the other one may be a secondary node. The first network device and the second network device may use different RATs. In one embodiment, the first network device may be a first RAT device and the second network device may be a second RAT device. In one embodiment, the first RAT device is eNB and the second RAT device is gNB, or vice versa. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.'

The term 'another embodiment' is to be read as 'at least one other embodiment.' The terms 'first,' 'second,' and the like may refer to different or same objects.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

In some scenarios, user equipment A (UE-A) and user equipment B (UE-B) are scheduled as uplink multi-user multiple-input multiple-output (MU-MIMO), UE-A transmits DM-RS and UE-B transmits no or less DM-RS when a network device can infer the uplink channel based on AI/ML model. In this case, it may be desired to map the UE-B's data to reduce DM-RS overhead and avoid interference to UE-A. It also may be desired to let the UE-B know the data mapping.

In some scenarios, UE-A and UE-B are scheduled as downlink MU-MIMO, the network device transmits no or less DM-RS when UE-A requires normal transmission of DM-RS from the network device (for example, UE-A has no CSI inference capability or has CSI inference capability but requires transmission of DM-RS) and UE-B can infer the downlink channel based on AI/ML model. In this case, it may be desired to map the UE-B's data to reduce DM-RS overhead and avoid interference to UE-A. It also may be desired to let the UE-B know the data mapping.

In view of the above scenarios, embodiments of the present disclosure provide solutions for data transmission with no or less DM-RS transmission. In one aspect, a transmitting device transmits at least one of data or PT-RS to a receiving device in at least part of REs on a first symbol, the first symbol being configured for DM-RS transmission but having no DM-RS transmission. In this way, DM-RS overhead may be reduced and the interference to co-scheduled UE may be avoided.

In another aspect, an indication indicating no or less DM-RS transmission is comprised in DCI. In this way, the terminal device may know whether DM-RS transmission is to be transmitted for uplink data transmission, or whether a trained CSI is to be used for downlink data reception.

Embodiments of the present disclosure may be applied to at least one of AI/ML enabled networks, FWA networks or low mobility networks. Principles and implementations of the present disclosure will be described in detail below with reference to the figures.

Example of Communication Network

FIG. 1 illustrates an example communication network 100 in which embodiments of the present disclosure can be implemented. As shown in FIG. 1, the network 100 may include a network device 110 and a terminal device 120 served by the network device 110. The network 100 may also include a terminal device 130 served by the network device 110. It is to be understood that the number of network devices and terminal devices as shown in FIG. 1 is only for the purpose of illustration without suggesting any limitations. The network 100 may include any suitable number of devices adapted for implementing embodiments of the present disclosure.

As shown in FIG. 1, the network device 110 may communicate with the terminal devices 120 and 130 by means of MU-MIMO technology. In some embodiments, data may be communicated together with DM-RS between the network device 110 and the terminal devices 120 and 130. In some embodiments, data may be communicated together with DM-RS and PT-RS between the network device 110 and the terminal devices 120 and 130.

The communications in the network 100 may conform to any suitable standards including, but not limited to, New Radio (NR), 5G-Advanced, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols, 5G-Advanced networks, or the sixth generation (6G) networks.

In some embodiments, the terminal devices 120 and 130 may be scheduled as uplink MU-MIMO. In some embodiments, the terminal devices 120 and 130 may be scheduled as downlink MU-MIMO. In some embodiments, the network device 110 may have CSI inference capability. In this case, any of the terminal devices 120 and 130 may perform uplink data transmission with no or less DM-RS transmission. In some embodiments, any of the terminal devices 120 and 130 may have CSI inference capability. In this case, the network device 110 may perform downlink data transmission with no or less DM-RS transmission. In some embodiments, the network device 110 and the terminal devices 120 and 130 may both have CSI inference capability. In this case, any of the terminal devices 120 and 130 may perform uplink data transmission with no or less DM-RS transmission and the network device 110 may perform downlink data transmission with no or less DM-RS transmission. For convenience, the following description is made by taking the terminal device 120 as an example, and it is to be noted that the same also applies to the terminal device 130.

Further, it is to be noted that although embodiments of the present disclosure is described in connection with a slot which includes 14 symbols, the present disclosure may also be applied to sub-slot or mini-slot which includes less than 14 symbols.

Embodiments of the present disclosure provide solutions for data transmission with no or less DM-RS transmission. These solutions will be described in detail below with reference to FIGS. 2 to 9.

Example Implementation of Data Transmission with No or Less DM-RS

Figure 2:
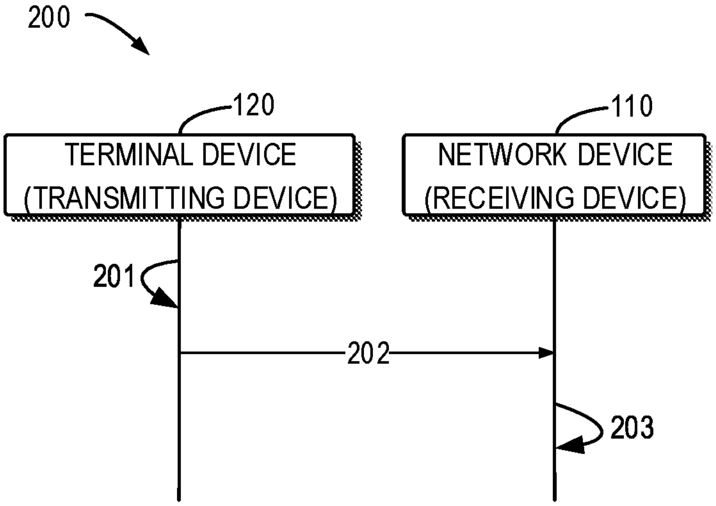
FIG. 2 illustrates a schematic diagram illustrating an example process for data transmission with no or less DM-RS transmission according to some embodiments of the present disclosure.

FIG. 2 illustrates a schematic diagram illustrating an example process 200 for data transmission with no or less DM-RS transmission according to some embodiments of the present disclosure. For the purpose of discussion, the process 200 will be described with reference to FIG. 1. The process 200 may involve a first device (for example, a transmitting device) and a second device (for example, a receiving device). For illustration, embodiments of the present disclosure will be described by taking a transmitting device as an example of the first device and a receiving device as an example of the second device.

In some embodiments for downlink transmission, the transmitting device may be a network device (for example, the network device 110 as shown in FIG. 1), and the receiving device may be a terminal device (for example, the terminal device 120 as shown in FIG. 1). In some embodiments for uplink transmission, the transmitting device may be a terminal device (for example, the terminal device 120) and the receiving device may be a network device (for example, the network device 110).

For convenience, the following description is made by taking the terminal device 120 and the network device 110 as examples of the transmitting device and the receiving device respectively (i.e., uplink transmission). It is to be noted that the same process may also be applied to downlink transmission.

As shown in FIG. 2, the terminal device 120 determines 201 whether no DM-RS is to be transmitted on a symbol (also referred to as first symbol herein) configured for DM-RS transmission. In some embodiments, the terminal device 120 may determine whether no DM-RS is to be transmitted based on at least one of the following: DM-RS configuration type, single-symbol or double-symbol DM-RS, hopping configuration, a physical uplink shared channel (PUSCH) mapping type, or the number of DM-RS code division multiplexing (CDM) groups without data.

If no DM-RS is to be transmitted on the first symbol, the terminal device 120 transmits 202 a signal to the network device 110 in at least part of REs on the first symbol. In some embodiments, the signal may be data. The data may be any information mapped to a physical downlink shared channel (PDSCH) or a PUSCH. In some embodiments, the signal may be PT-RS. In some embodiments, the signal may comprise both data and PT-RS. Upon receipt of the signal, the network device 110 demodulates 203 the signal from the first symbol. For illustration, some example embodiments will be described below in connection with Embodiments 1-5.

EMBODIMENT 1

In this embodiment, the terminal device 120 may transmit the signal in a RE (also referred to as a first RE herein) on the first symbol, the first RE being configured for the DM-RS transmission. In other words, the first RE is a configured DM-RS position. In this way, the configured DM-RS position may be used for transmission of data or PT-RS.

In some embodiments, the transmission in the first RE is performed with first energy per resource element (EPRE), the first EPRE being higher than a second EPRE in a second RE on a second symbol, the second RE being configured for transmission of the signal. For illustration, some examples will be described with reference to FIGS. 3A and 3B.

Figure 3A:
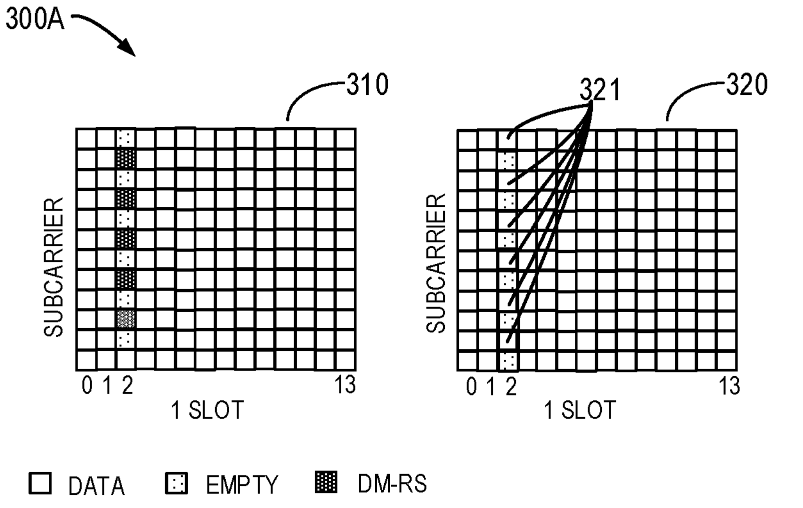
FIG. 3A illustrates an example data mapping according to some embodiments of the present disclosure.

FIG. 3A illustrates an example data mapping 300A according to some embodiments of the present disclosure. In this example, the DM-RS configuration type is DM-RS configuration type 1, and the PUSCH mapping type is PUSCH mapping type A. Further, 1 symbol (for example, symbol 2) is configured for DM-RS position, and there is no additional DM-RS position. In addition, there is no hopping.

Assuming that the terminal devices 120 and 130 are configured for uplink transmission on the same time and frequency resource simultaneously, as known as uplink MU-MIMO. As shown in FIG. 3A, reference sign 310 denotes resource mapping for the terminal device 130, and reference sign 320 denotes resource mapping for the terminal device 120.

For example, the terminal device 130 is configured with “number of DM-RS CDM groups without data=2 or 1”, and the terminal device 120 is configured with “number of DM-RS CDM groups without data=2”. In this case, the terminal device 120 may determine that no DM-RS is to be transmitted on the symbol corresponding to symbol 2. That is, no DM-RS is to be transmitted on REs for DM-RS positions 321 in symbol 2.

In this embodiment, data is to be transmitted on the REs 321. The terminal device 120 may map the data to its configured DM-RS position, i.e., the REs 321. In some embodiments, PUSCH EPRE on each of the REs 321 may be higher than PUSCH EPRE on other RE by 3 dB. Accordingly, the network device 110 may demodulate the data on each of the REs 321 with EPRE on each RE 321 higher than that on other RE in other symbols where no DM-RS is configured by 3 dB.

In some embodiments, the terminal device 130 is configured with “number of DM-RS CDM groups without data=2 or 1”, and the terminal device 120 is configured with “number of DM-RS CDM groups without data=1”. In this case, the terminal device 120 may determine that no DM-RS is to be transmitted on the symbol corresponding to symbol 2. That is, no DM-RS is to be transmitted on REs for DM-RS positions 321 in symbol 2. Data is to be transmitted on the REs 321. The terminal device 120 may map the data to its configured DM-RS position, i.e., the REs 321. PUSCH EPRE on each of the REs 321 may be the same as PUSCH EPRE on other RE. Accordingly, the network device 110 may demodulate the data on each of the REs 321 with EPRE on each RE 321 the same as other RE in other symbols where no DM-RS is configured.

Figure 3B:
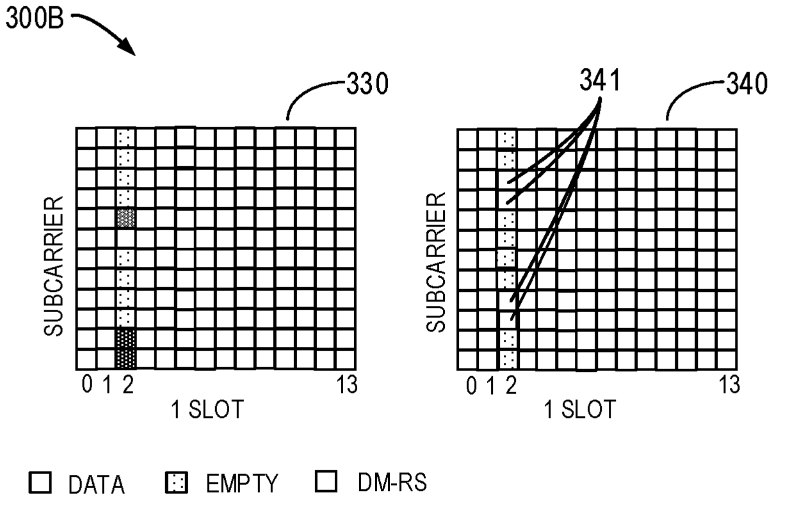
FIG. 3B illustrates an example data mapping according to some embodiments of the present disclosure.

FIG. 3B illustrates an example data mapping 300B according to some embodiments of the present disclosure. In this example, the DM-RS configuration type is DM-RS configuration type 2, and the PUSCH mapping type is PUSCH mapping type A. Further, 1 symbol (symbol 2) is configured for DM-RS position, and there is no additional DM-RS position. In addition, there is no hopping.

Assuming that the terminal devices 120 and 130 are configured for MU-MIMO. As shown in FIG. 3B, reference sign 330 denotes resource mapping for the terminal device 130, and reference sign 340 denotes resource mapping for the terminal device 120.

For example, the terminal device 130 is configured with “number of DM-RS CDM groups without data=3, 2 or 1”, and the terminal device 120 is configured with “number of DM-RS CDM groups without data=3”. In this case, the terminal device 120 may determine that no DM-RS is to be transmitted on the symbol corresponding to symbol 2. That is, no DM-RS is to be transmitted on REs for DM-RS positions 341 in symbol 2.

In this embodiment, data is to be transmitted on the REs 341. The terminal device 120 may map the data to its configured DM-RS position, i.e., the REs 341. In some embodiments, PUSCH EPRE on each of the REs 341 may be higher than PUSCH EPRE on other RE by 4.77 dB. Accordingly, the network device 110 may demodulate the data on each of the REs 341 with EPRE on each RE 341 higher than that on other RE in other symbols where no DM-RS is configured by 4.77 dB.

In some embodiments, the terminal device 130 is configured with “number of DM-RS CDM groups without data=3, 2 or 1”, and the terminal device 120 is configured with “number of DM-RS CDM groups without data=2”. In these embodiments, PUSCH EPRE on each of the REs 341 may be higher than PUSCH EPRE in other symbols where no DM-RS is configured by 3 dB.

In some embodiments, the terminal device 130 is configured with “number of DM-RS CDM groups without data=3, 2 or 1”, and the terminal device 120 is configured with "number of DM-RS CDM groups without data=1". In these embodiments, PUSCH EPRE on each of the REs 341 may be the same as PUSCH EPRE in other symbols where no DM-RS is configured.

EMBODIMENT 2

In this embodiment, the terminal device 120 may transmit the signal in a RE (also referred to as a third RE herein) on the first symbol, the third RE being configured for transmission of the signal. The terminal device 120 does not transmit DM-RS in the first RE configured for DM-RS transmission on the first symbol. That is, the terminal device 120 does not transmit DM-RS in a DM-RS position on the first symbol.

In some embodiments, the transmission in the third RE is performed with third EPRE, the third EPRE being higher than a second EPRE in a second RE on a second symbol, the second RE being configured for transmission of the signal. For illustration, some examples will be described with reference to FIG. 4.

Figure 4:
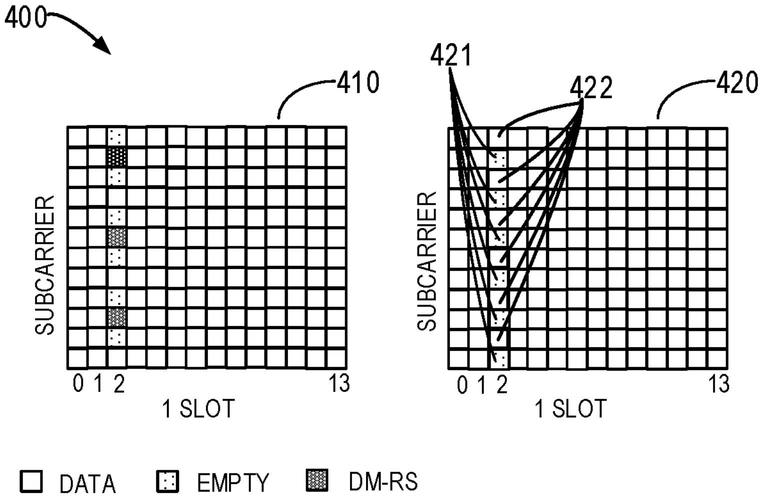
FIG. 4 illustrates an example data mapping according to some embodiments of the present disclosure.

FIG. 4 illustrates an example data mapping 400 according to some embodiments of the present disclosure. In this example, the DM-RS configuration type is DM-RS configuration type 1, and the PUSCH mapping type is PUSCH mapping type A. Further, 1 symbol (symbol 2) is configured for DM-RS position, and there is no additional DM-RS position. In addition, there is no hopping.

Assuming that the terminal devices 120 and 130 are configured for MU-MIMO. As shown in FIG. 4, reference sign 410 denotes resource mapping for the terminal device 130, and reference sign 420 denotes resource mapping for the terminal device 120.

For example, the terminal device 130 is configured with "number of DM-RS CDM groups without data=2 or 1", and the terminal device 120 is configured with "number of DM-RS CDM groups without data=1". In this case, the terminal device 120 may determine that no DM-RS is to be transmitted on the symbol corresponding to symbol 2.

In this embodiment, the terminal device 120 may not transmit DM-RS on REs for DM-RS positions 421 in symbol 2, and transmit data on REs 422 configured for data transmission in symbol 2. In some embodiments, PUSCH EPRE on each of the REs 422 may be higher than PUSCH EPRE on other RE in other symbols by 3 dB. Accordingly, the network device 110 may demodulate the data on each of the REs 422 with EPRE on each RE 422 higher than that on other RE in other symbols by 3 dB.

Comparing with Embodiment 1, Embodiment 2 may be considered as a different understanding or definition on the parameter "number of DM-RS CDM groups without data". In some embodiments, the terminal device 120 may receive from the network device 110 an indication on which one of definitions as described in Embodiments 1 and 2 is used.

EMBODIMENT 3

In this embodiment, the terminal device 120 may transmit the signal in the first RE and a fourth RE on the first symbol, the first RE being configured for DM-RS transmission, the fourth RE being configured as empty. The terminal device 120 does not transmit DM-RS in the first RE configured for DM-RS transmission on the first symbol. That is, the terminal device 120 does not transmit DM-RS in a DM-RS position on the first symbol. In other words, the terminal device 120 may map data to all REs in the first symbol.

In some embodiments, the transmission in each of the first and fourth REs is performed with the same EPRE as that in a second RE on a second symbol, the second RE being configured for transmission of the signal. For illustration, some examples will be described with reference to FIG. 5.

Figure 5:
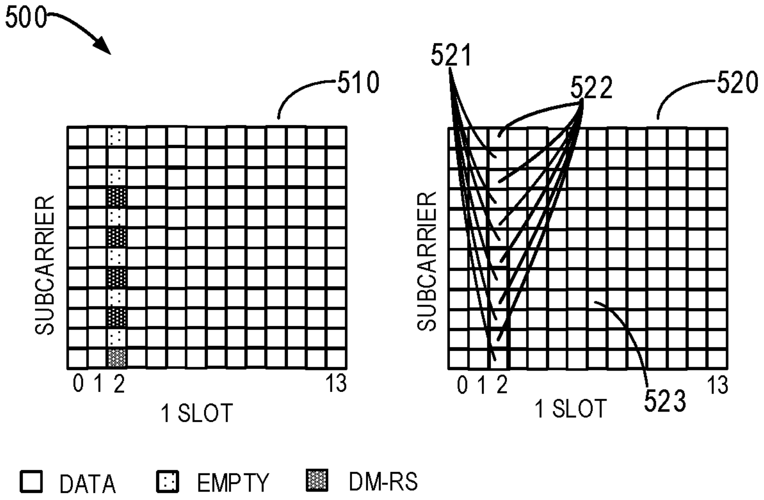
FIG. 5 illustrates an example data mapping according to some embodiments of the present disclosure.

FIG. 5 illustrates an example data mapping 500 according to some embodiments of the present disclosure. In this example, the DM-RS configuration type is DM-RS configuration type 1, and the PUSCH mapping type is PUSCH mapping type A. Further, 1 symbol (symbol 2) is configured for DM-RS position, and there is no additional DM-RS position. In addition, there is no hopping.

Assuming that the terminal devices 120 and 130 are configured for MU-MIMO. As shown in FIG. 5, reference sign 510 denotes resource mapping for the terminal device 130, and reference sign 520 denotes resource mapping for the terminal device 120.

In this case, the terminal device 120 may determine that no DM-RS is to be transmitted on the symbol corresponding to symbol 2. That is, no DM-RS is to be transmitted on REs for DM-RS positions 522 in symbol 2.

In this embodiment, in addition to data mapping to the configured DM-RS positions 522, data also is mapped to REs 521 configured as empty in symbol 2. In some embodiments, PUSCH EPRE on each of the REs 521 and 522 may be the same as PUSCH EPRE on other RE (for example, RE 523) in other symbols. Accordingly, the network device 110 may demodulate the data on each of the REs 521 and 522 with EPRE on each of REs 521 and 522 being same as that on other RE in other symbols.

EMBODIMENT 4

In this embodiment, the terminal device 120 may transmit the signal on the first symbol configured for DM-RS transmission, and transmit DM-RS on a second symbol configured for DM-RS transmission. The first symbol and second symbol can be either 2 symbols for a double-symbol DM-RS, or a DM-RS symbol and an additional DM-RS symbol. That is, the terminal device 120 may transmit less DM-RS transmission. In some embodiments, the terminal device 120 may transmit the signal on the first symbol as described in any of Embodiments 1-3. For illustration, some examples will be described with reference to FIG. 6.

Figure 6:
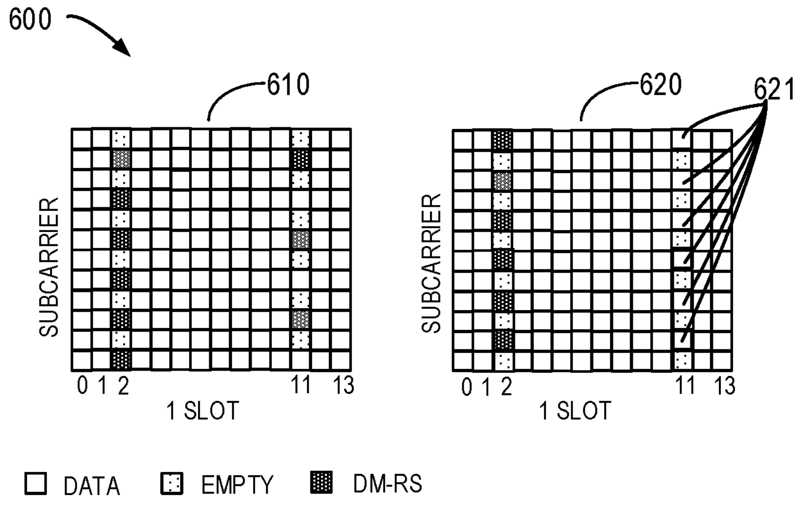
FIG. 6 illustrates an example data mapping according to some embodiments of the present disclosure.

FIG. 6 illustrates an example data mapping 600 according to some embodiments of the present disclosure. In this example, the DM-RS configuration type is DM-RS configuration type 1, and the PUSCH mapping type is PUSCH mapping type A. Further, 1 symbol (symbol 2) is configured for DM-RS position, and there is additional DM-RS position (symbol 11). In addition, there is no hopping.

Assuming that the terminal devices 120 and 130 are configured for MU-MIMO. As shown in FIG. 6, reference sign 610 denotes resource mapping for the terminal device 130, and reference sign 620 denotes resource mapping for the terminal device 120.

For example, the terminal device 130 is configured with "number of DM-RS CDM groups without data=2 or 1", and the terminal device 120 is configured with "number of DM-RS CDM groups without data=2". If the terminal device 120 determines that less DM-RS is to be transmitted, the terminal device 120 may map data to its configured additional DM-RS position (symbol 11). For example, the terminal device 120 may map DM-RS to front loaded DM-RS position (symbol 2) and map data to additional DM-RS position (REs 621 in symbol 11) or vice versa.

In some embodiments, PUSCH EPRE on each of the REs 621 may be higher than PUSCH EPRE on other RE in other symbols by 3 dB. Accordingly, the network device 110 may demodulate the data on each of the REs 621 with EPRE on each of REs 621 being higher than PUSCH EPRE on other RE in other symbols by 3 dB.

It should be noted that FIG. 6 is merely an example, and data mapping in symbol 11 may be carried out in a similar way as data mapping in symbol 2 described in connection with Embodiments 1-3, and thus other details are omitted here for concise.

EMBODIMENT 5

In this embodiment, the terminal device 120 may map PT-RS on a configured DM-RS position. For illustration, an example will be described with reference to FIG. 7.

Figure 7:
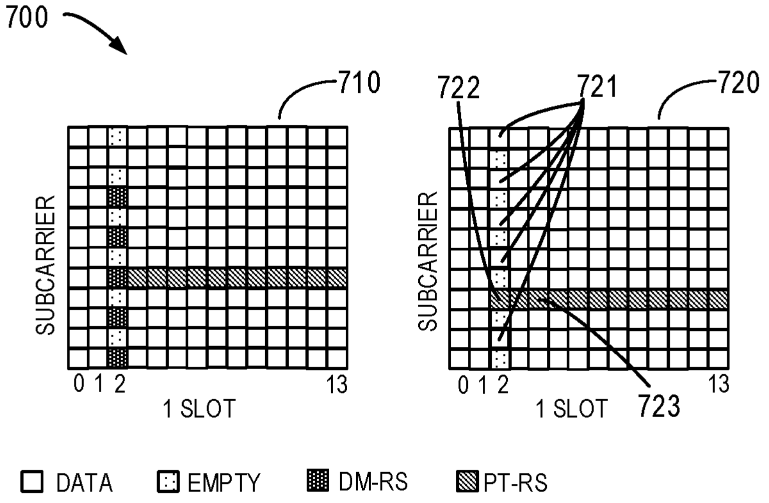
FIG. 7 illustrates an example data mapping according to some embodiments of the present disclosure.

FIG. 7 illustrates an example data mapping 700 according to some embodiments of the present disclosure. In this example, the DM-RS configuration type is DM-RS configuration type 1, and the PUSCH mapping type is PUSCH mapping type A. Further, 1 symbol (symbol 2) is configured for DM-RS position, and there is no additional DM-RS position. In addition, there is no hopping.

Assuming that the terminal devices 120 and 130 are configured for MU-MIMO. As shown in FIG. 7, reference sign 710 denotes resource mapping for the terminal device 130, and reference sign 720 denotes resource mapping for the terminal device 120.

In this case, the terminal device 120 may determine that no DM-RS is to be transmitted on the symbol corresponding to symbol 2. That is, no DM-RS is to be transmitted on REs for DM-RS positions 721 in symbol 2.

In this embodiment, PT-RS time location is extended to the configured DM-RS position, i.e., RE 722. In some embodiments, PT-RS EPRE on RE 722 may be higher than PT-RS EPRE on other RE (for example, RE 723) in other symbols by 3 dB. It is to be noted that although FIG. 7 shows that data is transmitted on the REs 721, the present disclosure is not limited to this. For example, the REs 721 may be empty.

Although Embodiments 1-5 are described in connection with uplink transmission, the similar processes also apply to downlink transmission, in which PUSCH will be replaced with a physical downlink shared channel (PDSCH) PDSCH. Other details are not repeated here for concise.

Example Implementaton of Indication of No or Less DM-RS

According to embodiments of the present disclosure, an indication indicating no or less DM-RS transmission is comprised in DCI. In this way, the terminal device may know whether DM-RS transmission is to be transmitted for uplink data transmission, or whether a trained CSI is to be used for downlink data reception. This will be described in detailed in connection with Embodiments 6-8.

EMBODIMENT 6

Figure 8:
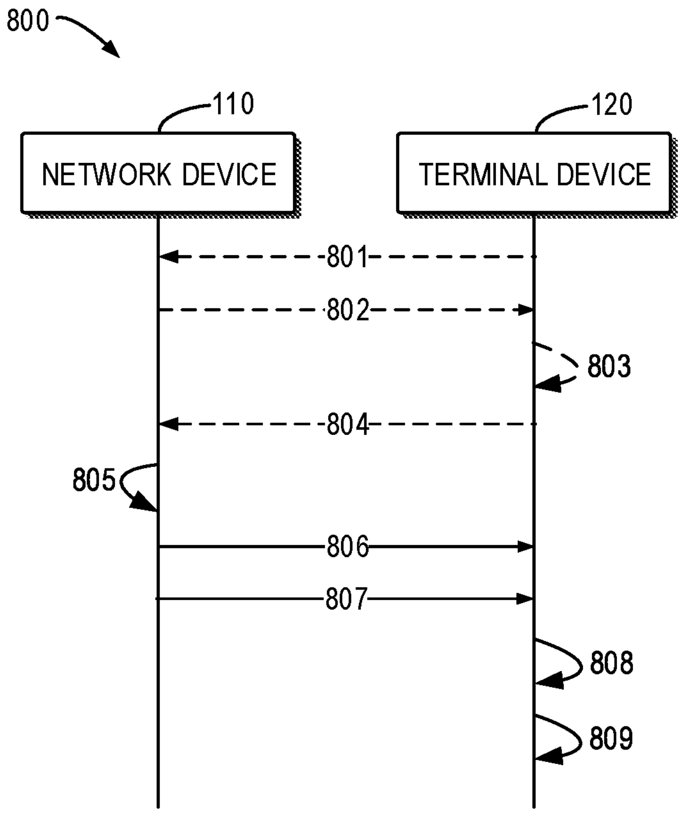
FIG. 8 illustrates a schematic diagram illustrating an example process for communication in case that a terminal device has a CSI interference capability according to some embodiments of the present disclosure.

In this embodiment, the terminal device 120 has a CSI inference capability, and the network device 110 may have or not have a CSI inference capability. FIG. 8 illustrates a schematic diagram illustrating an example process 800 for communication in case that a terminal device has a CSI interference capability according to some embodiments of the present disclosure. For the purpose of discussion, the process 800 will be described with reference to FIG. 1. The process 800 may involve the terminal device 120 and the network device 110.

As shown in FIG. 8, the terminal device 120 may report 801 its CSI inference capability to the network device 110. In some embodiments, the report may comprise information indicating that the capability is specific to downlink, uplink or both. In some embodiments, the report may comprise information indicating that the capability is in high, medium or low level. In some embodiments, the report may comprise information regarding a duration for which the inferred CSI is valid. In other words, within the duration, the terminal device 120 may infer the CSI without the help of DM-RS.

The network device 110 may transmit 802 a reference signal (RS) to the terminal device 120. Based on the RS, the terminal device 120 may train 803 its downlink channel information to determine a trained CSI. In some embodiments, the terminal device 120 may train its downlink channel information in a periodic manner. In some embodiments, the terminal device 120 may train its downlink channel information in an aperiodic manner. For example, the network device 110 may send trigger information to inform the terminal device 120 to train its downlink channel information. In some embodiments, the terminal device 120 may train its downlink channel information in a semi-persistent manner.

In some embodiments, the terminal device 120 may transmit 804 an indication (also referred to as a second indication herein) indicating that the trained CSI is ready. In some embodiments, the indication may comprise a duration (also denoted as M0 herein for convenience) for which the CSI inference capability is valid. In some embodiments, the indication may comprise a bandwidth for which the trained CSI applies.

The network device 110 generates 805 DCI for scheduling downlink data to the terminal device 120. In some embodiments, the DCI may comprise an indication (also referred to as a first indication herein) that the downlink data is transmitted with no or less DM-RS transmission. In some embodiments, the network device 110 may generate the DCI based on the report of the CSI inference capability by the terminal device 120 and transmit the DCI to the terminal device 120.

In some embodiments, the network device 110 may guarantee that the duration M0 meets the following equation (1).

$$M0 \geqslant T0 \tag{1}$$

where T0 denotes a time interval (also referred to a first time interval) between the transmission of the second indication and the demodulation of the downlink data, and T0 meets the following equation (2).

$$T0 \geqslant S0 \tag{2}$$

where S0 denotes a time interval (also referred to a second time interval herein) between the transmission of the DCI and that of the downlink data.

The network device 110 transmits 806 the DCI to the terminal device 120. The network device 110 transmits 807 downlink data to the terminal device 120. In some embodiments, the network device 110 may determine a transport block size (TBS) of the downlink data based on whether the downlink data is to be transmitted with no DM-RS or less DM-RS transmission, and transmit the downlink data based on the TBS.

For example, the related specification on TBS determination in 3GPP TS 38.214 v16.5.0 may be modified as below.

The UE shall first determine the number of REs (NRE) within the slot.

A UE first determines the number of REs allocated for PDSCH within a PRB $$(N'_{RE})$$

by $$N'_{RE} = N_{sc}^{RB} \cdot N_{symb}^{sh} - N_{DMRS}^{PRB} - N_{oh}^{PRB},$$

where $$N_{sc}^{RB} = 12$$

is the number of subcarriers in a physical resource block, $$N_{symb}^{sh}$$

is the number of symbols of the PDSCH allocation within the slot, $$N_{DMRS}^{PRB}$$

is the number of REs for DM-RS per PRB in the scheduled duration including the overhead of the DM-RS CDM groups without data, as indicated by DCI format 1_1 or format 1_2 or as described for format 1_0 in Clause 5.1.6.2, if UE is configured that no DMRS is transmitted in downlink, $$N_{DMRS}^{PRB}$$

is zero; if if UE is configured that less DMRS is transmitted, $$N_{DMRS}^{PRB}$$

is the actual transmitted number of REs for DM-RS per PRB, and $$N_{oh}^{PRB}$$

is the overhead configured by higher layer parameter xOverhead in PDSCH-ServingCellConfig. If the xOverhead in PDSCH-ServingCellconfig is not configured (a value from 6, 12, or 18), the $$N_{oh}^{PRB}$$

is set to 0. If the PDSCH is scheduled by PDCCH with a CRC scrambled by SI-RNTI, RA-RNTI, MSGB-RNTI or P-RNTI, $$N_{oh}^{PRB}$$

is assumed to be 0.

Upon receipt of the downlink data, the terminal device 120 determines 808 whether the DCI comprises the first indication. If the DCI comprises the first indication, the terminal device 120 demodulates 809 the downlink data based on the trained CSI. If the terminal device 120 receives data when the trained channel information is not valid, e.g. M0<T0, or DCI does not includes "No DMRS" or "less DMRS" information, the terminal device 120 may not use the trained information for data demodulation.

With the process of FIG. 8, the terminal device may know whether uplink data is transmitted with no or less DM-RS transmission.

EMBODIMENT 7

In this embodiment, the terminal device 120 has a CSI inference capability, and the network device 110 may have or not have a CSI inference capability. This embodiment is a simplification to Embodiment 6 in that no second indication is generated and transmitted.

The terminal device 120 may report its CSI inference capability to the network device 110. In some embodiments, the report may comprise information indicating that the capability is specific to downlink, uplink or both. In some embodiments, the report may comprise information indicating that the capability is in high, medium or low level. In some embodiments, the report may comprise information regarding a duration for which the capability is valid. In other words, within the duration, the terminal device 120 may infer the CSI without the help of DM-RS.

Based on a RS from the network device 110, the terminal device 120 may train its downlink channel information to determine a trained CSI.

The network device 110 may generate DCI for scheduling downlink data to the terminal device 120. In some embodiments, the DCI may comprise the first indication that the downlink data is transmitted with no or less DM-RS transmission. In some embodiments, the network device 110 may generate the DCI based on the report of the CSI inference capability by the terminal device 120 and transmit the DCI to the terminal device 120.

Upon receipt of the downlink data, the terminal device 120 determines whether the DCI comprises the first indication. If the DCI comprises the first indication, the terminal device 120 demodulates the downlink data based on the trained CSI. If the DCI does not comprise the first indication, the terminal device 120 demodulates the downlink data based on DM-RS configuration.

With this embodiment, the terminal device may know whether uplink data is transmitted with no or less DM-RS transmission in a simple way.

EMBODIMENT 8

Figure 9:
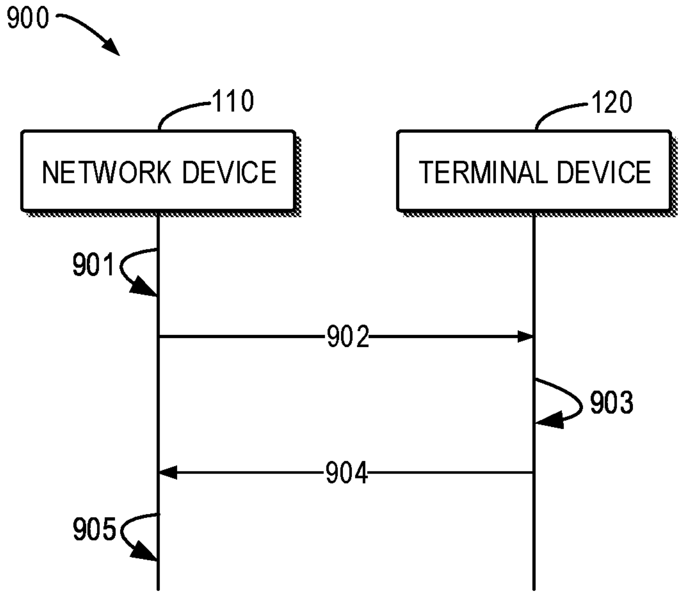
FIG. 9 illustrates a schematic diagram illustrating an example process for communication in case that a network device has a CSI interference capability according to some embodiments of the present disclosure.

In this embodiment, the network device 110 has a CSI inference capability, and the terminal device 120 may have or not have a CSI inference capability. FIG. 9 illustrates a schematic diagram illustrating an example process 900 for communication in case that a network device has a CSI interference capability according to some embodiments of the present disclosure. For the purpose of discussion, the process 900 will be described with reference to FIG. 1. The process 900 may involve the terminal device 120 and the network device 110.

As shown in FIG. 9, the network device 110 generates 901 DCI scheduling transmission of uplink data. In some embodiments, the DCI may comprise an indication (also referred to as a third indication) that the uplink data is to be transmitted with no or less DM-RS transmission. The network device 110 transmits 902 the DCI to the terminal device 120.

Upon receipt of the DCI, the terminal device 120 determines 903 whether the DCI comprises the third indication. If determining that the DCI comprises the third indication, the terminal device 120 transmits 904 uplink data with no or less transmission to the network device 110.

In some embodiments, the network device 110 may determine a TBS of the uplink data based on whether the uplink data is to be transmitted with no or less DM-RS transmission, and transmit the uplink data based on the TBS. The operation of the determination of the TBS is similar with that described in connection with FIG. 8.

In some embodiments, the network device 110 may receive a RS from the terminal device 120 and obtain a trained CSI by training uplink CSI based on the RS. Upon receipt of the uplink data, the network device 110 demodulates 905 the uplink data based on a trained CSI.

In some embodiments, the network device 110 may guarantee that a duration M2 for which the trained CSI is valid meets the following equation (3).

$$M2 \geqslant T2 \qquad (3)$$

where T2 denotes a time interval (also referred to a third time interval herein) between the training of the trained CSI and the demodulation of the uplink data, and T2 meets the following equation (4).

$$T2 \geqslant S2 \qquad (4)$$

where S2 denotes a time interval (also referred to a fourth time interval herein) between the transmission of the DCI and that of the uplink data.

In some embodiments, the terminal device 120 may determine a TBS of the uplink data based on whether the uplink data is to be transmitted with no DM-RS or less DM-RS transmission, and transmit the uplink data based on the TBS.

For example, the related specification on TBS determination in 3GPP TS 38.214 v16.5.0 may be modified as below.

$$N'_{RE} = N_{sc}^{RB} \cdot N_{symb}^{sh} - N_{DMRS}^{PRB} - N_{oh}^{PRB},$$

where $$N_{sc}^{RB} = 12$$

is the number of subcarriers in the frequency domain in a physical resource block, $$N_{symb}^{sh}$$

is the number of symbols L of the PUSCH allocation according to Clause 6.1.2.1 for scheduled PUSCH or Clause 6.1.2.3 for configured PUSCH, $$N_{DMRS}^{PRB}$$

is the number of REs for DM-RS per PRB in the allocated duration including the overhead of the DM-RS CDM groups without data, as described for PUSCH with a configured grant in Clause 6.1.2.3 or as indicated by DCI format 0_1 or DCI format 0_2 or as described for DCI format 0_0 in Clause 6.2.2, if UE is configured not to transmit DMRS, $$N_{DMRS}^{PRB}$$

is zero; if if UE is configured to transmit less DMRS, $$N_{DMRS}^{PRB}$$

is the actual transmitted number of REs for DM-RS per PRB, and $$N_{oh}^{PRB}$$

is the overhead configured by higher layer parameter xOverhead in PUSCH-ServingCellConfig. If the $$N_{oh}^{PRB}$$

is not configured (a value from 6, 12, or 18), the $$N_{oh}^{PRB}$$

is assumed to be 0. For Msg3 or MsgA PUSCH transmission the $$N_{oh}^{PRB}$$

is always set to 0. In case of PUSCH repetition Type B, $$N_{DMRS}^{PRB}$$

is determined assuming a nominal repetition with the duration of L symbols without segmentation.

In some embodiments, if the network device 110 knows that the trained CSI is not valid when the network device 110 receives scheduled data from the terminal device 120, the network device 110 may not cause the third indication to be comprised in DCI. In this case, the terminal device 120 may transmit DM-RS as scheduled.

With the process of FIG. 9, the terminal device may know whether downlink data is demodulated based on a trained CSI.

Example Implemenation of Methods

Figure 10:
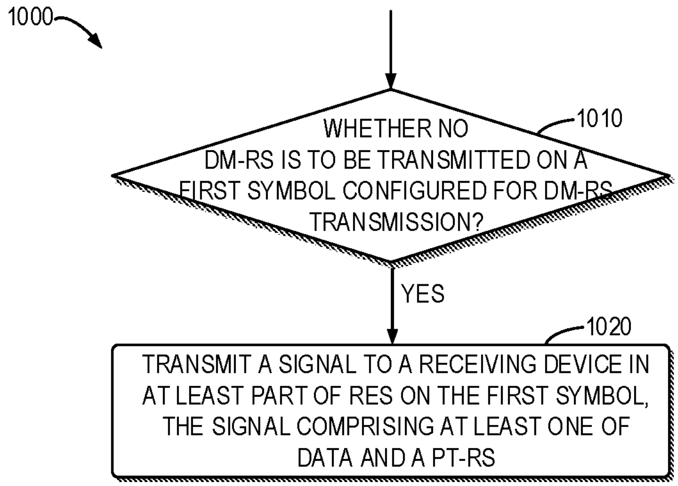
FIG. 10 illustrates a flowchart of an example method implemented at a transmitting device in accordance with some embodiments of the present disclosure.

Corresponding to the above processes, embodiments of the present disclosure also provide methods of communication. FIG. 10 illustrates a flowchart of an example method 1000 implemented at a transmitting device in accordance with some embodiments of the present disclosure. The method 1000 can be implemented at the network device 110 or terminal device 120 shown in FIG. 1. It is to be understood that the method 1000 may include additional acts not shown and/or may omit some shown acts, and the scope of the present disclosure is not limited in this regard.

At block 1010, a transmitting device (for example, the terminal device 120) determines whether no DM-RS is to be transmitted on a first symbol configured for DM-RS transmission. In some embodiments, the transmitting device may determine whether no DM-RS is to be transmitted based on at least one of the following: a DM-RS configuration type, a PUSCH mapping type, single-symbol or double-symbol DM-RS, hopping configuration, or the number of DM-RS CDM groups without data.

If no DM-RS is to be transmitted on the first symbol, the process proceeds to block 1020. At block 1020, the transmitting device transmits a signal to a receiving device (for example, the network device 110) in at least part of REs on the first symbol. The signal may comprise at least one of data or PT-RS.

In some embodiments, the transmitting device may transmit the signal in a first RE on the first symbol, the first RE being configured for the DM-RS transmission. In some embodiments, the transmission in the first RE is performed with first EPRE, the first EPRE being higher than a second EPRE in a second RE on a second symbol, the second RE being configured for transmission of the signal.

In some embodiments, the transmitting device may transmit the signal in a third RE on the first symbol, the third RE being configured for transmission of the signal, and wherein no DM-RS is transmitted in a first RE on the first symbol, the first RE being configured for the DM-RS transmission. In some embodiments, the transmission in the third RE is performed with third EPRE, the third EPRE being higher than a second EPRE in a second RE on a second symbol, the second RE being configured for transmission of the signal.

In some embodiments, the transmitting device may transmit the signal in a first RE and a fourth RE on the first symbol, the first RE being configured for the DM-RS transmission and the fourth RE being configured as empty. In some embodiments, the transmission in each of the first and fourth REs is performed with the same EPRE as that in a second RE on a second symbol, the second RE being configured for transmission of the signal.

In some embodiments, the transmitting device may transmit the DM-RS on a second symbol configured for the DM-RS transmission.

Figure 11:
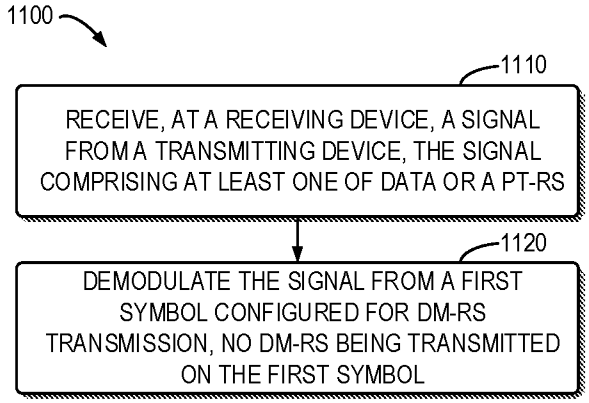
FIG. 11 illustrates a flowchart of an example method implemented at a receiving device in accordance with some embodiments of the present disclosure.

FIG. 11 illustrates a flowchart of an example method 1100 implemented at a receiving device in accordance with some embodiments of the present disclosure. The method 1100 can be implemented at terminal device 120 or the network device 110 shown in FIG. 1. It is to be understood that the method 1100 may include additional acts not shown and/or may omit some shown acts, and the scope of the present disclosure is not limited in this regard.

At block 1110, a receiving device (for example, the network device 110) receives a signal from a transmitting device (for example, the terminal device 120). The signal may comprise at least one of data or PT-RS.

At block 1120, the receiving device demodulates the signal from a first symbol configured for DM-RS transmission, no DM-RS being transmitted on the first symbol.

In some embodiments, the receiving device may demodulate the signal in a first RE on the first symbol, the first RE being configured for the DM-RS transmission. In some embodiments, the demodulation in the first RE is performed with first EPRE, the first EPRE being higher than a second EPRE in a second RE on a second symbol, the second RE being configured for transmission of the signal.

In some embodiments, the receiving device may demodulate the signal in a third RE on the first symbol, the third RE being configured for transmission of the signal, and wherein no DM-RS is received in a first RE on the first symbol, the first RE being configured for the DM-RS transmission. In some embodiments, the demodulation in the third RE may be performed with third EPRE, the third EPRE being higher than a second EPRE in a second RE on a second symbol, the second RE being configured for transmission of the signal.

In some embodiments, the receiving device may demodulate the data information in a first RE and a fourth RE on the first symbol, the first RE being configured for the DM-RS transmission and the fourth RE being configured as empty. In some embodiments, the demodulation in each of the first and fourth REs may be performed with the same EPRE as that in a second RE on a second symbol, the second RE being configured for transmission of the data information.

In some embodiments, the receiving device may receive the DM-RS on a second symbol configured for the DM-RS transmission.

In some embodiments, the transmitting device may be a terminal device, and the receiving device may be a network device. In some embodiments, the transmitting device may be a network device, and the receiving device may be a terminal device.

The operations of methods 1000 and 1100 correspond to the process described in connection with FIGS. 2 to 7 and Embodiments 1-5, and thus other details are omitted here.

Figure 12:
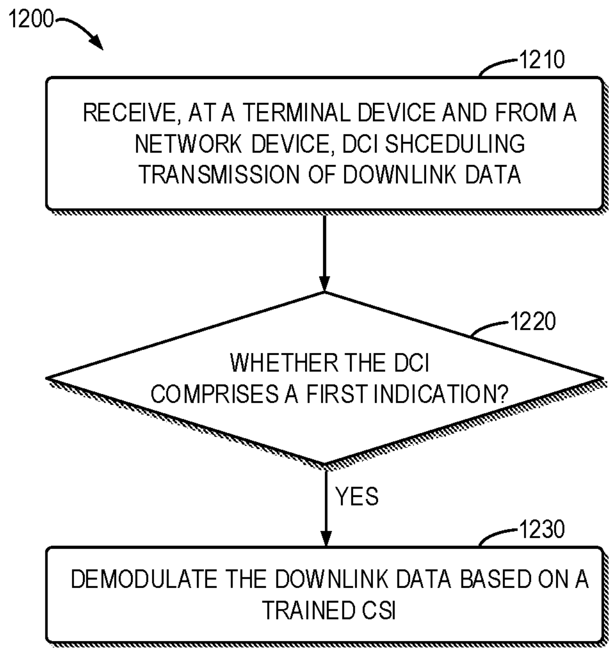
FIG. 12 illustrates a flowchart of an example method implemented at a terminal device in accordance with some embodiments of the present disclosure.

FIG. 12 illustrates a flowchart of an example method 1200 of communication implemented at a terminal device in accordance with some embodiments of the present disclosure. The method 1200 can be implemented at the terminal device 120 shown in FIG. 1. For the purpose of discussion, the method 1200 will be described with reference to FIG. 1. It is to be understood that the method 1200 may include additional acts not shown and/or may omit some shown acts, and the scope of the present disclosure is not limited in this regard.

As shown in FIG. 12, at block 1210, the terminal device 120 receives, from the network device 10, DCI scheduling transmission of downlink data.

At block 1220, the terminal device 120 determines whether the DCI comprises a first indication that the downlink data is transmitted with no DM-RS or less DM-RS transmission. If determining that the DCI comprises the first indication, the process proceeds to block 1230.

At block 1230, the terminal device 120 demodulates the downlink data based on a trained CSI. In some embodiments, if determining that the DCI does not comprise the first indication, the terminal device 120 may demodulate the downlink data based on a DM-RS configuration for the terminal device 120.

In some embodiments, the terminal device 120 may transmit, to the network device 110, a report indicating a capability of the terminal device for CSI inference. In some embodiments, the report may comprise at least one of the following: information indicating that the capability is specific to downlink, uplink or both; information indicating that the capability is in high, medium or low level; or information regarding a duration for which the capability is valid.

In some embodiments, the terminal device 120 may receive a RS from the network device 110, and determine the trained CSI by training downlink CSI based on the RS.

In some embodiments, the terminal device 120 may transmit, to the network device 110, a second indication indicating at least one of the following: information indicating that the trained CSI is ready, a duration for which the capability is valid, or a bandwidth for which the trained CSI applies.

In some embodiments, the duration may be equal to or larger than a first time interval between the transmission of the second indication and the demodulation of the downlink data, and the first time interval may be equal to or larger than a second time interval between transmission of the DCI and that of the downlink data.

Figure 13:
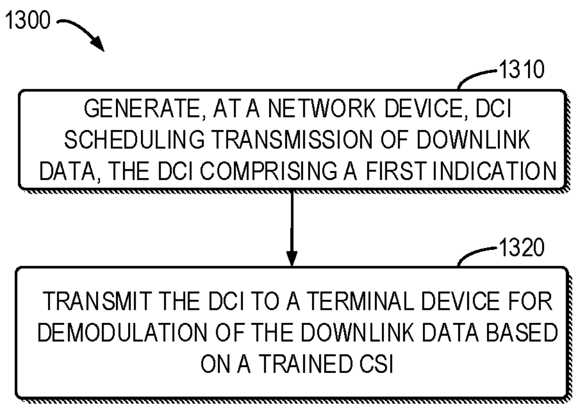
FIG. 13 illustrates a flowchart of an example method implemented at a network device in accordance with some embodiments of the present disclosure.

FIG. 13 illustrates a flowchart of an example method 1300 of communication implemented at a network device in accordance with some embodiments of the present disclosure. The method 1300 can be implemented at the network device 110 shown in FIG. 1. For the purpose of discussion, the method 1300 will be described with reference to FIG. 1. It is to be understood that the method 1300 may include additional acts not shown and/or may omit some shown acts, and the scope of the present disclosure is not limited in this regard.

As shown in FIG. 13, at block 1310, the network device 110 generates DCI scheduling transmission of downlink data, the DCI comprising a first indication that the downlink data is transmitted with no DM-RS or less DM-RS transmission.

In some embodiments, the network device 110 may receive, from the terminal device 120, a report indicating a capability of the terminal device for CSI inference; and generating the DCI based on the report. In some embodiments, the report may comprise at least one of the following: information indicating that the capability is specific to downlink, uplink or both; information indicating that the capability is in high, medium or low level; or information regarding a duration for which the capability is valid.

At block 1320, the network device 110 transmits the DCI to the terminal device 120 for demodulation of the downlink data based on a trained CSI.

In some embodiments, the network device 110 may receive, from the terminal device 120, a second indication indicating at least one of the following: information indicating that the trained CSI is ready, a duration for which the capability is valid, or a bandwidth for which the trained CSI applies. In some embodiments, the duration may be equal to or larger than a first time interval between the transmission of the second indication and the demodulation of the downlink data, and the first time interval may be equal to or larger than a second time interval between the transmission of the DCI and that of the downlink data.

In some embodiments, the network device 110 may determine a transport block size of the downlink data based on whether the downlink data is to be transmitted with no DM-RS or less DM-RS transmission, and transmit the downlink data based on the transport block size.

The operations of methods 1200 and 1300 correspond to the process described in connection with FIG. 8 and Embodiments 6 and 7, and thus other details are omitted here.

Figure 14:
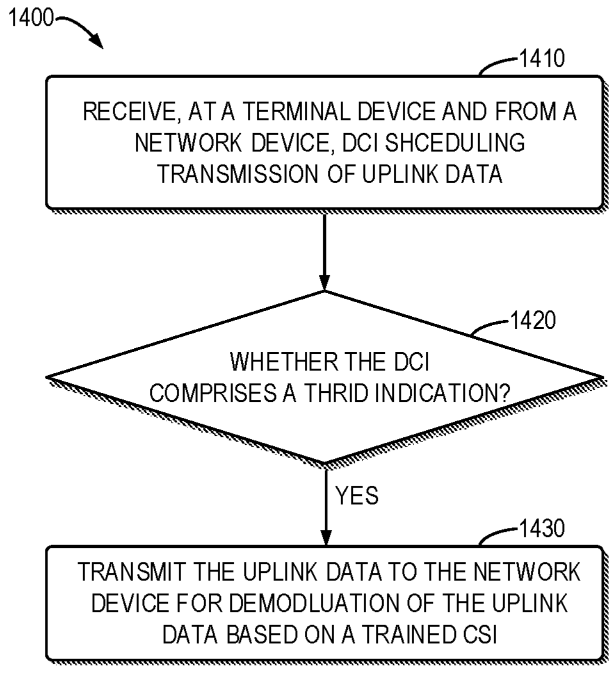
FIG. 14 illustrates a flowchart of another example method implemented at a terminal device in accordance with some embodiments of the present disclosure.

FIG. 14 illustrates a flowchart of another example method 1400 of communication implemented at a terminal device in accordance with some embodiments of the present disclosure. The method 1400 can be implemented at the terminal device 140 shown in FIG. 1. For the purpose of discussion, the method 1400 will be described with reference to FIG. 1. It is to be understood that the method 1400 may include additional acts not shown and/or may omit some shown acts, and the scope of the present disclosure is not limited in this regard.

As shown in FIG. 14, at block 1410, the terminal device 120 receives, from the network device 10, DCI scheduling transmission of uplink data.

At block 1420, the terminal device 120 determines whether the DCI comprises a third indication that the uplink data is to be transmitted with no DM-RS or less DM-RS transmission. If determining that the DCI comprises the third indication, the process proceeds to block 1430.

At block 1430, the terminal device 120 transmits the uplink data to the network device 110 for demodulation of the uplink data based on a trained CSI. In some embodiments, if determining the DCI does not comprise the third indication, the terminal device 120 may transmit the uplink data with a DM-RS transmission scheduled for the terminal device. In some embodiments, a duration for which the trained CSI is valid is equal to or larger than a third time interval between a training of the trained CSI and the demodulation of the uplink data, and the third time interval is equal to or larger than a fourth time interval between transmission of the DCI and that of the uplink data.

In some embodiments, the terminal device 120 may determine a transport block size of the uplink data based on whether the uplink data is to be transmitted with no DM-RS or less DM-RS transmission, and transmit the uplink data based on the transport block size.

Figure 15:
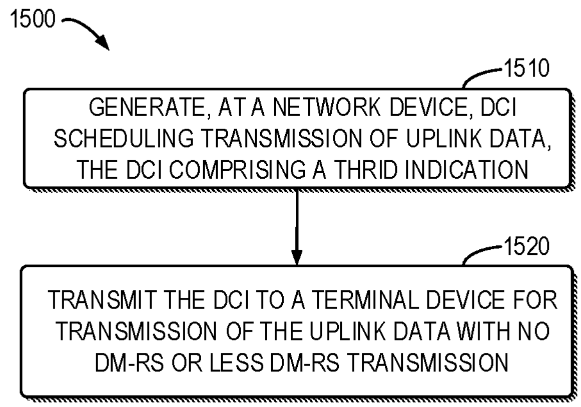
FIG. 15 illustrates a flowchart of another example method implemented at a network device in accordance with some embodiments of the present disclosure.

FIG. 15 illustrates a flowchart of another example method 1500 of communication implemented at a network device in accordance with some embodiments of the present disclosure. The method 1500 can be implemented at the network device 110 shown in FIG. 1. For the purpose of discussion, the method 1500 will be described with reference to FIG. 1. It is to be understood that the method 1500 may include additional acts not shown and/or may omit some shown acts, and the scope of the present disclosure is not limited in this regard.

As shown in FIG. 15, at block 1510, the network device 110 generates DCI scheduling transmission of uplink data, the DCI comprising a third indication that the uplink data is to be transmitted with no DM-RS or less DM-RS transmission.

At block 1520, the network device 110 transmits the DCI to the terminal device 120 for transmission of the uplink data with no DM-RS or less DM-RS transmission. In some embodiments, the network device 110 may receive a RS from the terminal device 120, and obtain a trained CSI by training uplink CSI based on the RS.

In some embodiments, the network device 110 may receive the uplink data from the terminal device 120, and demodulate the uplink data based on the trained CSI. In some embodiments, a duration for which the trained CSI is valid may be equal to or larger than a third time interval between a training of the trained CSI and the demodulation of the uplink data, and the third time interval may be equal to or larger than a fourth time interval between transmission of the DCI and that of the uplink data.

The operations of methods 1400 and 1500 correspond to the process described in connection with FIG. 9 and Embodiment 8, and thus other details are omitted here.

Example Implementation of Device

Figure 16:
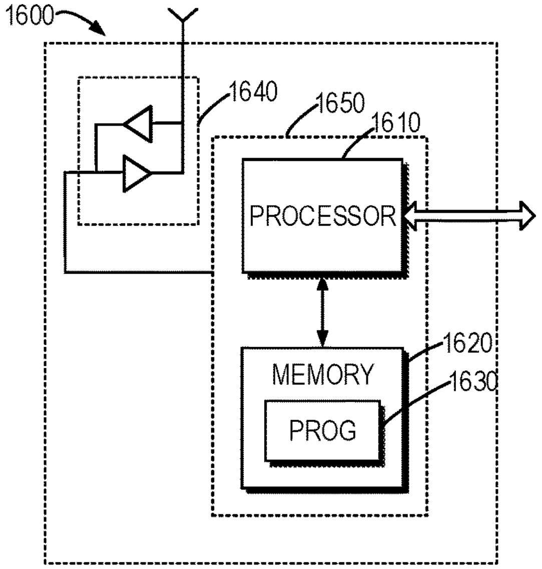
FIG. 16 is a simplified block diagram of a device that is suitable for implementing embodiments of the present disclosure.

FIG. 16 is a simplified block diagram of a device 1600 that is suitable for implementing embodiments of the present disclosure. The device 1600 can be considered as a further example implementation of the network device 110 or the terminal device 120 as shown in FIG. 1. Accordingly, the device 1600 can be implemented at or as at least a part of the network device 110 or the terminal device 120.

As shown, the device 1600 includes a processor 1610, a memory 1620 coupled to the processor 1610, a suitable transmitter (TX) and receiver (RX) 1640 coupled to the processor 1610, and a communication interface coupled to the TX/RX 1640. The memory 1610 stores at least a part of a program 1630. The TX/RX 1640 is for bidirectional communications. The TX/RX 1640 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1630 is assumed to include program instructions that, when executed by the associated processor 1610, enable the device 1600 to operate in accordance with the embodiments of the present disclosure, as discussed herein with reference to FIGS. 1 to 15. The embodiments herein may be implemented by computer software executable by the processor 1610 of the device 1600, or by hardware, or by a combination of software and hardware. The processor 1610 may be configured to implement various embodiments of the present disclosure. Furthermore, a combination of the processor 1610 and memory 1620 may form processing means 1650 adapted to implement various embodiments of the present disclosure.

The memory 1620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1620 is shown in the device 1600, there may be several physically distinct memory modules in the device 1600. The processor 1610 may be of any type suitable to the local technical network, and may include one or more of general purpose computers, special purpose computers, microprocessors, digital signal processors (DSPs) and processors based on multicore processor architecture, as non-limiting examples. The device 1600 may have multiple processors, such as an application specific integrated circuit chip that is slaved in time to a clock which synchronizes the main processor.

In some embodiments, a transmitting device comprises circuitry configured to: determine whether no DM-RS is to be transmitted on a first symbol configured for DM-RS transmission; and in accordance with a determination that no DM-RS is to be transmitted on the first symbol, transmitting a signal to a receiving device in at least part of REs on the first symbol, the signal comprising at least one of data or a PT-RS.

In some embodiments, the circuitry may be further configured to determine whether no DM-RS is to be transmitted based on at least one of the following: a DM-RS configuration type, a PUSCH mapping type, or the number of DM-RS CDM groups without data.

In some embodiments, the circuitry may be further configured to transmit the signal in a first RE on the first symbol, the first RE being configured for the DM-RS transmission. In some embodiments, the transmission in the first RE may be performed with first EPRE, the first EPRE being higher than a second EPRE in a second RE on a second symbol, the second RE being configured for transmission of the signal.

In some embodiments, the circuitry may be further configured to transmit the signal in a third RE on the first symbol, the third RE being configured for transmission of the signal, and wherein no DM-RS is transmitted in a first RE on the first symbol, the first RE being configured for the DM-RS transmission. In some embodiments, the transmission in the third RE may be performed with third EPRE, the third EPRE being higher than a second EPRE in a second RE on a second symbol, the second RE being configured for transmission of the signal.

In some embodiments, the circuitry may be further configured to transmit the signal in a first RE and a fourth RE on the first symbol, the first RE being configured for the DM-RS transmission and the fourth RE being configured as empty. In some embodiments, the transmission in each of the first and fourth REs is performed with the same EPRE as that in a second RE on a second symbol, the second RE being configured for transmission of the signal.

In some embodiments, the circuitry may be further configured to transmit the DM-RS on a second symbol configured for the DM-RS transmission.

In some embodiments, a receiving device comprises circuitry configured to: receive a signal from a transmitting device, the signal comprising at least one of data or a PT-RS; and demodulate the signal from a first symbol configured for DM-RS transmission, no DM-RS being transmitted on the first symbol.

In some embodiments, the circuitry may be configured to demodulate the signal in a first RE on the first symbol, the first RE being configured for the DM-RS transmission. In some embodiments, the demodulation in the first RE may be performed with first energy per resource element (EPRE), the first EPRE being higher than a second EPRE in a second RE on a second symbol, the second RE being configured for transmission of the signal.

In some embodiments, the circuitry may be configured to demodulate the signal in a third RE on the first symbol, the third RE being configured for transmission of the signal, and wherein no DM-RS is received in a first RE on the first symbol, the first RE being configured for the DM-RS transmission. In some embodiments, the demodulation in the third RE is performed with third EPRE, the third EPRE being higher than a second EPRE in a second RE on a second symbol, the second RE being configured for transmission of the signal.

In some embodiments, the circuitry may be configured to demodulate the data information in a first RE and a fourth RE on the first symbol, the first RE being configured for the DM-RS transmission and the fourth RE being configured as empty. In some embodiments, the demodulation in each of the first and fourth REs may be performed with the same EPRE as that in a second RE on a second symbol, the second RE being configured for transmission of the data information.

In some embodiments, the circuitry may be further configured to receive the DM-RS on a second symbol configured for the DM-RS transmission.

In some embodiments, the transmitting device may be a terminal device, and the receiving device may be a network device. In some embodiments, the transmitting device may be a network device, and the receiving device may be a terminal device.

In some embodiments, a terminal device comprises circuitry configured to: receiving, from a network device, DCI scheduling transmission of downlink data; and in accordance with a determination that the DCI comprises a first indication that the downlink data is transmitted with no DM-RS or less DM-RS transmission, demodulate the downlink data based on a trained CSI.

In some embodiments, the circuitry may be further configured to: in accordance with a determination that the DCI does not comprise the first indication, demodulate the downlink data based on a DM-RS configuration for the terminal device.

In some embodiments, the circuitry may be further configured to: transmit, to the network device, a report indicating a capability of the terminal device for CSI inference. In some embodiments, the report may comprise at least one of the following: information indicating that the capability is specific to downlink, uplink or both; information indicating that the capability is in high, medium or low level; or information regarding a duration for which the capability is valid.

In some embodiments, the circuitry may be further configured to receive a RS from the network device; and determine the trained CSI by training downlink CSI based on the RS.

In some embodiments, the circuitry may be further configured to transmit, to the network device, a second indication indicating at least one of the following: information indicating that the trained CSI is ready, a duration for which the capability is valid, or a bandwidth for which the trained CSI applies. In some embodiments, the duration is equal to or larger than a first time interval between the transmission of the second indication and the demodulation of the downlink data, and the first time interval is equal to or larger than a second time interval between transmission of the DCI and that of the downlink data.

In some embodiments, a network device comprises circuitry configured to: generate DCI scheduling transmission of downlink data, the DCI comprising a first indication that the downlink data is transmitted with no DM-RS or less DM-RS transmission; and transmit the DCI to a terminal device for demodulation of the downlink data based on a trained CSI.

In some embodiments, the circuitry may be configured to: receive, from the terminal device, a report indicating a capability of the terminal device for CSI inference; and generate the DCI based on the report. In some embodiments, the report may comprise at least one of the following: information indicating that the capability is specific to downlink, uplink or both; information indicating that the capability is in high, medium or low level; or information regarding a duration for which the capability is valid.

In some embodiments, the circuitry may be further configured to: receive, from the terminal device, a second indication indicating at least one of the following: information indicating that the trained CSI is ready, a duration for which the capability is valid, or a bandwidth for which the trained CSI applies. In some embodiments, the duration is equal to or larger than a first time interval between the transmission of the second indication and the demodulation of the downlink data, and the first time interval is equal to or larger than a second time interval between the transmission of the DCI and that of the downlink data.

In some embodiments, the circuitry may be further configured to: determine a transport block size of the downlink data based on whether the downlink data is to be transmitted with no DM-RS or less DM-RS transmission; and transmit the downlink data based on the transport block size.

In some embodiments, a terminal device comprises circuitry configured to: receive, from a network device, DCI scheduling transmission of uplink data; and in accordance with a determination that the DCI comprises a third indication that the uplink data is to be transmitted with no DM-RS or less DM-RS transmission, transmit the uplink data to the network device for demodulation of the uplink data based on a trained CSI.

In some embodiments, the circuitry may be further configured to: in accordance with a determination that the DCI does not comprise the third indication, transmit the uplink data with a DM-RS transmission scheduled for the terminal device. In some embodiments, a duration for which the trained CSI is valid is equal to or larger than a third time interval between a training of the trained CSI and the demodulation of the uplink data, and the third time interval is equal to or larger than a fourth time interval between transmission of the DCI and that of the uplink data.

In some embodiments, the circuitry may be configured to: determine a transport block size of the uplink data based on whether the uplink data is to be transmitted with no DM-RS or less DM-RS transmission; and transmit the uplink data based on the transport block size.

In some embodiments, a network device comprises circuitry configured to: generating DCI scheduling transmission of uplink data, the DCI comprising a third indication that the uplink data is to be transmitted with no DM-RS or less DM-RS transmission; and transmitting the DCI to a terminal device for transmission of the uplink data with no DM-RS or less DM-RS transmission.

In some embodiments, the circuitry may be further configured to: receive a RS from the terminal device; and obtaining a trained CSI by training uplink CSI based on the RS. In some embodiments, the circuitry may be configured to: receive the uplink data from the terminal device; and demodulate the uplink data based on the trained CSI. In some embodiments, a duration for which the trained CSI is valid is equal to or larger than a third time interval between a training of the trained CSI and the demodulation of the uplink data, and the third time interval is equal to or larger than a fourth time interval between transmission of the DCI and that of the uplink data.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory (ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2-15. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communication performed by a first device, the method comprising:

determining whether no demodulation reference signal (DM-RS) is to be transmitted on a first symbol configured for DM-RS transmission;

transmitting, to a second device in at least part of resource elements (REs) on the first symbol, a first signal in a case where no DM-RS is to be transmitted on the first symbol, wherein the first signal comprises at least one of data or a phase tracking reference signal (PT-RS); and transmitting, to the second device, an indication indicating demodulation of the first signal is based on a channel state information (CSI) inference.

2. The method of claim 1, wherein determining whether no DM-RS is to be transmitted comprises:

determining whether no DM-RS is to be transmitted based on at least one of the following:

a DM-RS configuration type;

a physical uplink shared channel (PUSCH) mapping type; or the number of DM-RS code division multiplexing (CDM) groups without data.

3. The method of claim 1, wherein transmitting the first signal comprises:

transmitting the first signal in a first RE on the first symbol, wherein the first RE is configured for the DM-RS transmission.

4. The method of claim 3, wherein the transmission in the first RE is performed with first energy per resource element (EPRE), the first EPRE being higher than a second EPRE in a second RE on a second symbol, the second RE being configured for transmission of the first signal.

5. The method of claim 1, wherein transmitting the first signal comprises:

transmitting the first signal in a third RE on the first symbol, the third RE being configured for transmission of the first signal, wherein no DM-RS is transmitted in a first RE on the first symbol, the first RE being configured for the DM-RS transmission.

6. The method of claim 5, wherein the transmission in the third RE is performed with third energy per resource element (EPRE), the third EPRE being higher than a second EPRE in a second RE on a second symbol, the second RE being configured for transmission of the first signal.

7. The method of claim 1, wherein transmitting the first signal comprises:

transmitting the first signal in a first RE and a fourth RE on the first symbol, wherein the first RE is configured for the DM-RS transmission and the fourth RE being configured as empty.

8. The method of claim 7, wherein the transmission in each of the first and fourth REs is performed with the same energy per resource element (EPRE) as that in a second RE on a second symbol, the second RE being configured for transmission of the first signal.

9. The method of claim 1, further comprising:

transmitting the DM-RS on a second symbol configured for the DM-RS transmission.

10. A method for communication performed by a second device, the method comprising:

receiving, from a first device, a first signal comprising at least one of data or a phase tracking reference signal (PT-RS);

receiving, from the first device, an indication indicating demodulation of the first signal is based on a channel state information (CSI) inference; and demodulating the first signal from a first symbol configured for demodulation reference signal (DM-RS) transmission based on the CSI inference, wherein no DM-RS is transmitted on the first symbol.

11. The method of claim 10, wherein demodulating the first signal comprises:

demodulating the first signal in a first RE on the first symbol, the first RE being configured for the DM-RS transmission.

12. The method of claim 11, wherein the demodulation in the first RE is performed with first energy per resource element (EPRE), the first EPRE being higher than a second EPRE in a second RE on a second symbol, the second RE being configured for transmission of the first signal.

13. The method of claim 11, wherein demodulating the first signal comprises:

demodulating the first signal in a third RE on the first symbol, the third RE being configured for transmission of the first signal, wherein no DM-RS is received in a first RE on the first symbol, the first RE being configured for the DM-RS transmission.

14. The method of claim 13, wherein the demodulation in the third RE is performed with third energy per resource element (EPRE), the third EPRE being higher than a second EPRE in a second RE on a second symbol, the second RE being configured for transmission of the first signal.

15. The method of claim 11, wherein demodulating the first signal comprises:

demodulating the data information in a first RE and a fourth RE on the first symbol, the first RE being configured for the DM-RS transmission and the fourth RE being configured as empty.

16. The method of claim 15, wherein the demodulation in each of the first and fourth REs is performed with the same energy per resource element (EPRE) as that in a second RE on a second symbol, the second RE being configured for transmission of the data information.

17. The method of claim 11, further comprising:

receiving the DM-RS on a second symbol configured for the DM-RS transmission.

18. A method for communication performed by a terminal device, the method comprising:

receiving, from a network device, downlink control information (DCI) scheduling transmission of downlink data, the DCI comprising an indication indicating demodulation of the downlink data is based on a channel state information (CSI) inference; and demodulating the downlink data based on the CSI inference in a case where the downlink data is transmitted with no demodulation reference signal (DM-RS) or less DM-RS transmission.

19. The method of claim 18, further comprising:

demodulating the downlink data based on a DM-RS configuration for the terminal device in a case where the downlink data is transmitted with no demodulation reference signal (DM-RS).

20. The method of claim 18, further comprising:

transmitting, to the network device, a report indicating a capability of the terminal device for CSI inference.

* * * * *